United States Patent [19]

Fung et al.

[11] Patent Number: 4,473,656

[45] Date of Patent: * Sep. 25, 1984

[54] PROCESS FOR REACTIVATING IRIDIUM-CONTAINING CATALYSTS

[75] Inventors: Shun C. Fung, Bridgewater, N.J.; Richard W. Rice, Clemson, S.C.

[73] Assignee: Exxon Research and Engineering Co., Florham Park, N.J.

[*] Notice: The portion of the term of this patent subsequent to May 8, 2001 has been disclaimed.

[21] Appl. No.: 511,659

[22] Filed: Jul. 7, 1983

Related U.S. Application Data

[62] Division of Ser. No. 374,975, May 5, 1982, Pat. No. 4,447,551.

[51] Int. Cl.$^3$ ............... B01J 23/96; C10G 35/09; C10G 35/085
[52] U.S. Cl. ............................. 502/35; 208/140; 502/36
[58] Field of Search .......................... 502/35–37, 502/230; 208/140

[56] References Cited

U.S. PATENT DOCUMENTS

| | | | |
|---|---|---|---|
| 3,622,520 | 11/1971 | Hayes | 252/415 |
| 3,625,860 | 12/1971 | Condrasky | 252/415 |
| 3,904,510 | 9/1975 | Sinfelt et al. | 208/140 |
| 3,937,600 | 2/1976 | Yates et al. | 208/140 |
| 3,939,061 | 2/1976 | Paynter et al. | 208/140 |
| 3,939,062 | 2/1976 | Sinfelt et al. | 208/140 |
| 3,941,682 | 3/1976 | Kmak et al. | 208/140 |
| 3,941,716 | 3/1976 | Paynter | 252/415 |
| 3,943,052 | 3/1976 | Kmak et al. | 208/140 |
| 3,981,823 | 9/1976 | Yates | 252/415 |
| 4,046,673 | 9/1977 | Paynter et al. | 208/140 |
| 4,159,938 | 7/1979 | Lewis | 208/139 |
| 4,172,817 | 10/1979 | Yates et al. | 208/140 |
| 4,359,400 | 11/1982 | Landolt et al. | 252/415 |

FOREIGN PATENT DOCUMENTS

| | | |
|---|---|---|
| 0057551 | 11/1982 | European Pat. Off. |
| 2257337 | 8/1975 | France . |
| 2290953 | 11/1975 | France . |
| 1484372 | 9/1977 | United Kingdom . |
| 1516518 | 7/1978 | United Kingdom . |

*Primary Examiner*—P. E. Konopka
*Attorney, Agent, or Firm*—Robert J. North; Edward H. Mazer

[57] ABSTRACT

A process is disclosed for reactivating an agglomerated iridium-containing catalyst and particularly platinum-iridium on alumina reforming catalysts. The process includes a reducing step involving contacting a decoked agglomerated catalyst with a reducing gas such as hydrogen to reduce agglomerated iridium oxides to the free metal, a hydrogen halide pretreatment step to provide a halide level to the catalyst of about 1.3 weight percent, and an elemental halogen redispersion step. The hydrogen halide pretreatment step is performed under elemental oxygen-free conditions prior to redispersion and allows high iridium redispersion values to be obtained. If no iridium oxides are initially present, the hydrogen step is optional.

20 Claims, No Drawings

PROCESS FOR REACTIVATING IRIDIUM-CONTAINING CATALYSTS

This is a division of application Ser. No. 374,975, filed May 5, 1982, now U.S. Pat. No. 4,447,551.

BACKGROUND OF THE INVENTION

This invention relates to a process for reactivating an agglomerated iridium-containing catalyst involving the sequential steps of reducing agglomerated iridium oxides if present on the catalyst surface to the free metal, pretreating the catalyst surface with a halide-providing compound, preferably hydrogen chloride in the absence of elemental oxygen, and redispersing the iridium metal by contacting with elemental halogen.

SUMMARY OF THE INVENTION

It has been found that iridium-containing catalysts containing agglomerated metallic iridium and/or iridium oxides can be efficiently redispersed and reactivated by the use of a halide pretreatment prior to a halogen redispersion step, both steps following decoking and reduction of the iridium oxides, if present.

The halide pretreatment step is conducted with two limitations, (1) that about 1.3 weight percent halide and, preferably 1.4 to 2.5 weight percent halide, taken as the coke-free, dry catalyst, and most preferably saturated with halide under the conditions used, is present on the catalyst surface after the pretreatment and maintained at or above this level up to and during the subsequent halogen redispersion step, and (2) that during the halide pretreatment step, no elemental oxygen is present in the feedstream or is generated in situ. If this halide level is not maintained during subsequent redispersion and if elemental oxygen is present during the pretreatment, then substantially lower redispersion values will be obtained with concomitant decrease in catalyst metal surface area and activity.

The subject process is applicable to a wide variety of iridium-containing catalysts and particularly to reforming catalysts employing platinum-iridium on alumina, which are completely or partially decoked.

Generally, halide-producing compounds are used in the pretreatment step including organic halides and hydrogen halides with gaseous hydrogen chloride being the preferred hydrogen halide-generating compound used in the pretreatment and chloride levels of about 1.3 weight percent of catalyst and above, on the catalyst surface are necessary to insure effective redispersion. The halide weight percent is expressed on the basis of dry, coke-free catalyst.

The pretreatment step is generally conducted in the temperature range of about 250° to 600° C., and the halide weight percentage can be monitored, for example, by X-ray fluorescence versus known standards. Generally, with the exception of very severely coked and agglomerated iridium-containing catalyst, the subject process is capable of producing substantially decoked, highly redispersed, iridium-containing catalyst in a one-cycle treatment.

In accordance with this invention, there is provided a process for reactivating an agglomerated catalyst containing metallic iridium comprising the steps of: (a) pretreating the catalyst by contact with a substantially elemental oxygen-free atmosphere comprising a halide-providing compound at an elevated temperature to provide about 1.3 weight percent and above, halide to the catalyst, based on the coke-free, dry catalyst; and (b) redispersing the metallic iridium from step (a) by contact, at an elevated temperature, with an atmosphere comprising elemental halogen.

A further embodiment of the process is where the agglomerated catalyst further initially contains iridium oxide which is contacted with a reducing atmosphere at elevated temperature to substantially convert said iridium oxide to metallic iridium prior to step (a).

DESCRIPTION OF THE INVENTION AND PREFERRED EMBODIMENTS

The novel process of the present invention includes a halide pretreatment step, prior to a halogen redispersion step, which enhances the potential of the process for mono-cycle reactivation/redispersion and eliminates the need as practiced in the prior art, for rigorous, extended multi-cycle hydrogen/halogen treatment to achieve high redispersion values.

It has been observed that treating a catalyst, which is low in halide content with halogen in a redispersion step without the halide pretreatment, results in the generation of water and oxygen. The generated oxygen moves through the catalyst bed ahead of the halogen "wave". Minimal or only partial redispersion is obtained.

However, halide pretreatment prior to halogen redispersion, results in an increase in catalyst halide without the generation of oxygen even though water is being produced. A subsequent halogen treatment of the catalyst results in excellent redispersion.

Furthermore, exposing the halide pretreated catalyst to oxygen during the halogen redispersion step also leads to excellent redispersion.

It appears that successful redispersion in the process can be achieved by the elimination of oxygen exposure of the reduced catalyst when the catalyst halide level is low. Thus, processes which provide the means of upgrading the catalyst halide level, without the release of oxygen before the halogen redispersion step or bring about the elimination of oxygen during the halogen redispersion step, will result in successful redispersion.

Catalysts which can be treated by the subject process include generally, iridium-containing catalysts, with and without co-catalysts, preferably being supported. Other metallic co-catalysts, which can be present with iridium, which are applicable in the process include metals such, for example, as platinum, rhodium, rhenium, palladium mixtures thereof and the like. The metals can be present in bimetallic, trimetallic combinations and higher combinations, as alloys or physical mixtures on the same support particles or where the metals are individually present on separate support particles. Preferred metal combinations in the catalyst for treatment by the subject process are platinum-iridium, and platinum-iridium-rhenium.

The metals can be supported on a suitable support, which is conventional, with the proviso that the support is stable during the pretreatment process and does not undergo any deleterious reactions. Representative examples include silica, zeolites, alumina, silica-alumina, zirconia, alumina-zirconia, mixtures thereof, and the like. In general, the active metallic components, if supported, are present in an amount of preferably up to about 10 weight percent of the supported catalysts.

A preferred catalyst which can be reactivated in the process is agglomerated platinum-iridium, preferably supported on alumina.

By the term, "agglomerated catalysts", as used herein, is meant a supported or unsupported catalyst containing metallic iridium singly, or in combination with other metals described herein, in the agglomerated state, sufficient to reduce the catalytic activity of the metal catalyst. The agglomerated metal, e.g., metallic iridium, can be present due to the result of oxygen burn-off of coke deposits producing agglomerated iridium oxide which then must be reduced to metallic iridium by hydrogen gas. Also, hydrogen stripping at high temperature, preferably about 450° to 600° C., will result in partial removal of coke deposits and leave the agglomerated iridium in an metallic state. The metallic iridium in the agglomerated catalyst will undergo effective redispersion by the process described herein. Where the catalyst additionally contains iridium oxide, a hydrogen reducing step is necessary to convert the iridium oxide to metallic iridium prior to redispersion.

The agglomerated metallic iridium-containing catalysts operable in the process can be completely or partially decoked as described above by separate oxygen or hydrogen treat steps or not decoked at all, but simply removed from an on-stream process, e.g., reforming in the presence of hydrogen gas at elevated temperature and subjected to the described process herein.

Agglomerated, coked catalysts are usually industrially decoked by an oxygen burn-off of carbon deposits. Generally, a typical used catalyst from industrial operation may contain up to about 6 weight % of carbon deposits and may be agglomerated after the decoking step up to about a 100% extent as evidenced by X-ray diffraction. Generally, depending on the conditions used in the coke burn, carbon deposits remaining may be present in about 0.05 to 1.0 weight percent of the catalyst, taken as the dry catalyst. In general, the agglomerates may be greater than about 50 Å and up to about 100 Å and greater in crystallite size. Decoking of the catalyst may be conducted under a variety of conditions, but is generally conducted by heating in an atmosphere containing 0.01 to 10 volume % $O_2$ at a temperature of about 400° to 550° C., to remove surface and embedded carbon deposits, and particularly "active" carbon deposits which can react with halogen during the redispersion step to form halogenated species which are not readily removed from the catalyst surface. Generally, about 60–100 weight percent of carbon deposits can be removed in the decoking step. For example, U.S. Pat. No. 3,904,510 describes a typical procedure employed in decoking. The subject process is applicable to a wide range of decoked agglomerated catalysts containing varying amounts of remaining carbon deposits, different degrees of agglomeration, varying particle size ranges and varying impurities.

An optional first step in the subject process is wherein said partially or completely decoked agglomerated catalyst is treated with a reducing atmosphere, generally comprising hydrogen gas to reduce primarily metal oxides and oxide layers which may be present on agglomerated metallic iridium particles, formed during decoking, and as a further aid in removing residual active carbon deposits from the decoking step. If no metallic oxides are present, then the reduction step, as described herein, is not mandatory. However, if metallic oxides are present, the reduction step must be conducted in order to achieve high values of redispersion. Other reducing or inert gases may also be present including nitrogen, helium and the like. The reducing step is generally conducted by contacting the catalyst at an elevated temperature generally in the range of about 250° to 600° C., preferably about 300° to 540° C. in a reducing atmosphere comprising above about one volume % hydrogen gas or above, for a time to substantially reduce metal oxides present to the free metal as evidenced by the absence of metal oxide lines and the appearance of iridium metal lines in the X-ray diffraction pattern. Larger and smaller volume percentages of hydrogen can also be effectively used.

X-ray diffraction patterns taken on fresh iridium-containing catalysts show no lines corresponding to any metal component, which indicates that the metal components are present in very small particle sizes, less than about 50 Å. X-ray diffraction patterns as taken on the same catalysts used in reforming, from which coke has been burned in numerous cycles of use, generally show distinct metal lines which indicate highly agglomerated metal particles, of about 10 to 100 weight percent agglomeration of crystallites of about 100 Å and greater. Thus, X-ray diffraction is a useful and convenient technique for measuring the extent of agglomeration, reduction and redispersion of the catalyst in the subject process.

Preferred conditions in the reducing step are the use of hydrogen as the reducing gas in a reducing atmosphere comprising essentially hydrogen, at a volume concentration of 0.05 to 5 volume percent and a pressure of about 0.1 to 2.0 MPa, and an inert gas carrier such as nitrogen or helium, particularly preferred at a temperature of about 300° to 540° C. for a time sufficient to achieve a substantial reduction of the iridium oxide and other metal oxide to the free metals. By the term "substantially reduce" is meant a reduction in the numerical amount of iridium oxides present by about 75–100% and preferably about 90–100%. Generally, time requirements for the reduction will be in the range from about one to several hours depending on the process conditions. Shorter and longer times are also applicable.

Following the reduction step, if performed, the partially or completely decoked-reduced catalyst is then subjected to halide pretreatment with a halide-providing compound. By the term "halide-providing compound" is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as carbon tetrachloride, methylene chloride, chloroform, methyl chloride, 1,2-dichloroethane, hexachloroethane, mixtures thereof, and the like. When using haloorgano compounds, hydrogen, in a large excess over the stoichiometric amount, must also be used to convert the haloorgano compound to a hydrogen halide.

The hydrogen halides can be hydrogen fluoride, hydrogen chloride, hydrogen bromide or hydrogen iodide. Preferably hydrogen chloride is the halide-generating compound used in the process. The atmosphere contacting the catalyst in this step can contain other inert gases, e.g., nitrogen and the like, and also including water vapor for more uniform distribution of halide on the catalyst surface prior to the halogenation treatment, and also preferably hydrogen gas or reducing gas in an amount of about 1–2 volume percent, to insure that the reduced catalyst remains in the reduced state during hydrogen halide pretreatment. It is essential that the atmosphere be substantially elemental oxygen-free during the halide pretreatment. Within this context, the halide feedstream should also preferably be elemental halogen-free since it is believed that elemental halogen reacts with surface hydroxyl groups to generate elemental oxygen. However, if chlorine is an impurity in the pretreating step gaseous mixture, then a small amount of hydrogen gas should be added to insure the absence of elemental oxygen.

The temperature of the halide pretreatment is generally conducted in the range of about 250° to 600° C. and preferably about 300° to 540° C., and the halide providing compound, at the above-identified temperature, is contacted with the catalyst in a gaseous stream until about 1.3 weight percent halide and above, is provided to the catalyst, as detected, for example, by X-ray fluorescence. Preferably, the catalyst is pretreated to a range of about 1.4 to 2.5 weight percent halide, or higher, and most preferably up to saturation by halide of the catalyst surface under the process conditions. As described hereinabove, the weight percentage of halide provided to the catalyst is taken as about 1.3 weight percent and above, said catalyst taken on a dry and coke-free basis. Where the catalyst has been extensively used in commercial processes having a lower surface area and catalytic activity as a result of this continued use, a minimum weight percentage of about one percent halide is reasonably believed to be effective in promoting high redispersion values in the subject process. For example, fresh catalysts having BET surface areas of 180 $m^2/g$ and higher will require 1.3 weight percent halide and above. Used catalysts having surface areas of about 100–180 $m^2/g$ will generally require a minimum of 1–1.3 weight percent halide prior to redispersion. However, an exact minimum value can't be stated for a commercial spent catalyst due to large variances in surface area, coke deposits, impurities and poisons present, and the like. One skilled in the art, however, will be able to utilize this disclosure successfully for efficient redispersion. It is important that the halide content be maintained up to the halogen redispersion treatment. If a "purge" of hydrogen, nitrogen, water, mixtures thereof, or other materials is used subsequent to the halide pretreatment, then such purge or contacting step should not reduce the halide level to below about 1.3 weight percent. If this happens, then the halide pretreatment should again be conducted to insure about 1.3 weight percent halide being present. This is particularly true in cases where multicycle treatment may be necessary in which the weight percent of halide present on the catalyst must be replenished again to about 1.3 weight percent or above, prior to each halogen redispersion treatment.

The halide pretreatment is conducted for sufficient time to achieve a halide loading as described above. In practice, a fast flowing stream of preferably hydrogen chloride is contacted with the catalyst up to and slightly beyond breakthrough. By the term "breakthrough" is meant the first visible detection by an analytical method such as, for example, the color change of an acid-base indicator, e.g., phenolphthalein.

Halide pretreatment is conducted to breakthrough to achieve desired halide loading of the catalyst and also to insure a uniform distribution of halide over the entire length of the catalyst bed to prevent "halide gradients" which can lead to non-uniform redispersion. In general, water vapor present in the halide feedstream will tend to lower the halide loading slightly below that compared to a dry halide application, by approximately about 0.4 weight percent, but generally results in a more uniform halide distribution. Thus, saturation by dry HCL of a coke-free, dry catalyst will result in up to about a 2.8 weight percent halide loading, whereas saturation with a wet stream of HCL will result in up to about 2.4 weight percent, or even slightly lower, halide loading.

Time required for the halide pretreatment will, of course, be dependent on many factors including flowrate, hydrogen halide gaseous concentrations, amount of catalyst, and can be desirably adjusted, for example, to run for about 1 to 3 hours per catalyst regeneration in general. Concentration of hydrogen halide can be from 0.05 to about 5 volume percent, or higher, in the feedstream, which can be at a total pressure of about 0.1 to 2 MPa. Higher and lower values of both variables can also be used effectively.

Following the halide pretreatment step, the catalyst is then subjected to a halogen redispersion step by contacting the catalyst with a stream comprising elemental halogen gas. Elemental halogen gases applicable are fluorine, chlorine, bromine and iodine with chlorine being a preferred embodiment.

The halogen redispersion is generally carried out at a temperature of about 450° to 600° C. and preferably about 500° to 540° C. At this temperature, the gaseous halogen atmosphere, industrially, is generally run at a flow rate over the surface of the catalyst of about 1.1 to 4.4 grams halogen or higher/100 grams catalyst/hour, said catalyst taken on the same basis as described in the hydrogen halide pretreatment, to achieve rapid halogen contact with the catalyst surface.

The gaseous halogen atmosphere may also contain inert gases such as nitrogen or helium as carrier gases, carbon dioxide from combustion processes, and also water vapor for corrosion inhibition and if present is in an amount of about 0.05 to 2 volume percent.

The gaseous halogen atmosphere can also contain elemental oxygen as a redispersion aid and if present, is present in an amount of about 0.05 to 25 volume percent. Preferably, elemental oxygen is present in a concentration of about 0.2 to 21 volume percent. Preferred is wherein elemental halogen and elemental oxygen are present in a volume ratio of about 0.05 to 10, respectively, and a particularly preferred range is 0.2 to 5 v/v. The presence of elemental oxygen also serves as an aid in removing small quantities of carbon deposits which may remain after the initial decoking step.

Halogen redispersion is generally conducted until breakthrough occurs, as evidenced or detected for example, by a starch-iodide indicator. Generally, this requires about 0.5 to 2 hours of halogen treatment for used catalyst, which depends upon flowrate, halogen concentration in the feedstream, and amount of catalyst. Generally, however, slightly longer times of halogen treatment are required for substantially complete redispersion as evidenced by the absence of crystalline metal or metal oxide lines in the X-ray diffraction patterns. Preferably a time of about 30 to 90 minutes past breakthrough, i.e., substantially past breakthrough, is necessary for substantially complete redispersion assuming a halogen flowrate of about 1.1 grams chlorine/100 grams catalyst/hour and above.

Operation past breakthrough of halogen is preferred to avoid redispersion gradients along the catalyst bed of redispersed iridium metal. Where gradients are present, usually redispersion levels of iridium metal are high at the front part (entrance) of the reactor but decrease towards the tail (exit) of the reactor.

By carrying out the process described herein substantially complete redispersions of iridium-containing catalysts have been achieved, as described in the following Examples, and particularly those of platinum-iridium on alumina used in hydrocarbon reforming operations. In the latter case, 75 to 100 percent redispersion of both the platinum and iridium agglomerated metals have been achieved in the process. The number of cycles necessary should preferably be one. However, in certain cases such as where minimum halogen treatment past breakthrough times are desired, multi-cycle treatment may prove necessary with concomitant need for additional pretreatment steps, as described hereinabove.

By the term "substantially complete redispersion" as used herein, is meant redispersion values, as determined by X-ray diffraction, of greater than about 55 numerical percent and preferably about 75 to 100 numerical percent of the iridium on the catalyst surface, also including other metals where present.

Apparatus useful for carrying out the subject process will be conventional in the art and whether operating on a laboratory scale, pilot plant or full commercial plant scale, the apparatus will be obvious to one skilled in the art.

In practice, following successful redispersion of iridium on the catalyst surface, a reduction of halide to about 1.0 weight percent is carried out prior to the actual reforming process since excess halide, at this stage, leads to cracking of the liquid hydrocarbon fraction to undesirably smaller hydrocarbon fragments. This reduction can be accomplished by a wet hydrogen stream, for example, which also serves to convert all of the metal species present after redispersion to the metallic state prior to use in a reforming process.

The following examples are illustrative of the best mode of carrying out the instant invention as contemplated by the inventors and should not be construed as being limitations on the scope or spirit of the instant invention.

EXAMPLE 1

Into a quartz, tubular, horizontal reactor was charged about 60 grams of a coke-free platinum-iridium on alumina catalyst, wherein 87% of the iridium was agglomerated (BET surface area of 200 $m^2/g$). It contained 0.3 wt. % iridium and 0.3 wt. % platinum, based on the total weight of the catalyst. The catalyst was divided into three approximately equal sections with quartz wool plugs as spacers between the sections. The catalyst in section 1 was at the entry of the reactor and the catalyst in section 3 was at the reactor exit. The chloride level on this catalyst was 0.67 wt. %, as determined by x-ray fluorescence.

The catalyst was treated with a gaseous mixture of 20% hydrogen in helium at one atmosphere for 2 hours at 524° C., whereby substantially all of the iridium oxide was reduced to metallic iridium, as evidenced by the absence of the X-ray diffraction line at 28.05 degrees ($2\theta$) ascribed to $IrO_2$. The hydrogen was purged from the catalyst bed with helium. The catalyst was then treated with a gaseous mixture of 1 volume percent hydrogen chloride and 1.4 volume percent water in helium at a temperature of about 524° C., until the exit HCl gas concentration was equal to that of the inlet. The catalyst was then treated with a gaseous mixture of 1 vol. % chlorine and 1.4 vol. % water in helium carrier gas at 524° C. The purpose for the presence of water was to minimize ferrous metal corrosion in the apparatus. The chlorine and water mixture treatment was discontinued after about 20 minutes when the chlorine concentration in the exit gas reached a steady state concentration.

A dynamic gas chromatograph technique was developed to analyze the gas phase composition at the exit of the reactor as the redispersion process proceeded. It was observed that elemental oxygen was not observed in the exit gas until shortly before the detection of chlorine. By contrast, in a related run where HCl pretreatment was not conducted prior to the chlorine redispersion (as in Example 1A), before chlorine was detected in the exit gas, oxygen appeared shortly after the introduction of chlorine.

The results for Example 1 are listed below in the Table under abbreviated columns for "% Iridium Agglomeration", "% $IrO_2$ Agglomeration", "% Total Agglomeration" and "% Redispersion", respectively, TBHB in the Table is the abbreviation for "Time Beyond Halogen Breakthrough". The symbol "I" represents "initial value" and the terms S-1, S-2 and S-3 represent values obtained after treatment for the catalyst in the first, second and third sections of the catalyst bed. The first section represents the entry section, and the third, the exit region.

The agglomerated catalyst described above was treated substantially the same in a related run except that before the introduction of gaseous chlorine into the catalyst bed to effect redispersion, the catalyst was not contacted with a gaseous mixture of hydrogen chloride and water in helium. In the chlorine redispersion step, the chlorine and water mixture treatment was discontinued after about 55 minutes when the chlorine concentration in the exit gas reached a steady state concentration. The results are given in the Table as Example 1A.

As is seen from contrasting the data of Examples 1 and 1A, about 4 times higher metal redispersion was obtained in the reactivation process consisting of hydrogen reduction coupled with hydrogen chloride treatment before chlorine redispersion, as contrasted to the absence of hydrogen chloride pretreatment.

The agglomerated catalyst described above was treated by substantially the same procedure as described in Example 1, including the reduction step, the HCl pretreatment step, and the elemental halogen redispersion step, except that after the hydrogen reduction and before HCl pretreatment step, a gaseous mixture of 0.5 vol. % oxygen and 1.4 vol. % water was introduced to the catalyst bed for a duration of one hour. During the chlorine redispersion treatment, chlorine flow was continued for 30 minutes past breakthrough (TBHB). The results are given in the Table as Example 1B. As is seen, exposure of the low chloride content (0.67 wt. %) catalyst to oxygen produces the same dertimental effect on catalyst reactivation as oxygen generated in situ indicated in Example 1A.

Utilizing substantially the same procedure of Example 1A, 60 grams of a 100% agglomerated fresh coke-free, platinum-iridium catalyst were subjected to the described reduction step and the halogen redispersion step with the exception that the feedstream in the halogen redispersion step contained 1 vol. % oxygen as well as 1.37 vol. % chlorine. Total halogen treatment time was 120 minutes. Results are given in the Table as Example 1C.

The data illustrate that oxygen present with chlorine in the redispersion step has no beneficial effect on the efficiency of redispersion in the absence of an HCl pretreatment step.

EXAMPLE 2

The catalyst of Example 1 was given a two-cycle redispersion treatment in which the first cycle was a duplicate of the procedure described in Example 1. The catalyst was left in the reactor while the second cycle was initiated and a second hydrogen reduction was carried out for one hour. After the reduction step, the reactor was purged with a gaseous mixture of 1.4 vol. % water in helium for 15 minutes. However, no HCl pretreatment was conducted prior to chlorine redispersion. Then the reduced catalyst was treated with a gaseous mixture of 1.0 vol. % chlorine and 1.4 vol. % water in helium until the outlet concentration of chlorine attained a steady state concentration. The results are given in the Table.

During the second hydrogen reduction, 0.41 wt. % of chloride was stripped from the catalyst as determined by gas phase analysis. Catalyst chloride level after the second hydrogen reduction could be estimated by subtracting lost chloride, 0.41 wt. %, from the values listed in the Table. However, the chloride concentration of the catalyst in the reactor was above the minimum level of 1.3 wt. % as indicated in the Table which resulted in high overall percent redispersion.

Analysis of the exit gas during the second chlorine treatment showed that oxygen at about 0.35 vol. %, was present in the exit gas, shortly after chlorine introduction. However, the duration of this high level oxygen exposure was relatively short, being about 15 minutes. It is reasonably believed that the high degree of the redispersion obtained after two cycles is the result of the protecting effect of high chloride concentration achieved in the first cycle which eliminates the adverse effect of elemental oxygen generated in situ during the second cycle.

EXAMPLE 3

The catalyst of Example 1 was treated substantially by the same procedure described in Example 1 except that in both the hydrogen chloride and chlorine treatment steps, the treatment times were extended for a period of about 45 minutes past breakthrough in a single-cycle treatment. The results are given below in the Table.

In a comparison of the data with that from Example 1, it is seen that longer treatment times past halogen breakthrough provide even greater iridium redispersion.

EXAMPLE 4

An alumina catalyst containing 0.3 wt. % iridium and 0.3 wt. % platinum, based on the total weight of the catalyst (BET surface area of 165 $m^2/g$), had been used in a reformer in the production of $C_5^+$ gasoline. Several weight percent of coke deposit was found on the catalyst after the catalyst had been on stream for several months. The catalyst was regenerated stepwise in the reactor with dilute oxygen at a flame front temperature up to 496° C. The coke-depleted catalyst suffered metal agglomeration and X-ray diffraction measurements taken after hydrogen reduction showed 68% of the total iridium as crystallites greater than 50 Å. There was about 0.1 wt. % of carbon left on the catalyst. Sixty grams of this catalyst was charged into the reactor and the reactivation procedure used was substantially the same as the single-cycle process described in Example 3. The results are given in the Table below.

This Example illustrates that the subject process is equally applicable to redispersing commercially spent catalysts with comparable efficiency.

EXAMPLE 5

The procedure of Example 1 was substantially rerun except that during the halogen redispersion step, elemental oxygen was also present in about 2 vol. % in addition to 1.36 vol. % chlorine. Total halogen treatment time was 25 minutes. Results are given below in the Table.

This Example illustrates that addition of oxygen to the halogen redispersion step which followed the HCL pretreatment results in even greater improvement in the redispersion, as compared to Example 1, in which no oxygen was added during the chlorine treatment.

In a related run, the same procedure described in Example 5 was utilized except that after the HCl pretreatment, a second wet hydrogen treatment was conducted for one hour with a stream containing 20 volume percent hydrogen and 1.4 vol. % water, followed by a wet helium purge prior to the chlorine redispersion. The weight percent chloride in the catalyst was measured by X-ray fluorescence prior to redispersion. The results are indicated below in the Table as Example 5A.

As is seen, where the weight percent chloride on the catalyst surface was only 1.2% following halide pretreatment, only 38% redispersion was obtained following halogen treatment.

TABLE

| Example | % Ir Agglom. TI[a] | S-1 | S-2 | S-3 | % IrO$_2$ Agglom. S-1 | S-2 | S-3 | % Total Agglom. S-1 | S-2 | S-3 | % Redis. S-1 | S-2 | S-3 | TBHB |
|---|---|---|---|---|---|---|---|---|---|---|---|---|---|---|
| 1[b] | 87 | 37 | 36 | 36 | 0 | 0 | 0 | 37 | 36 | 36 | 58 | 59 | 59 | 10 min. |
| 1A[c] | 87 | 74 | 73 | 67 | 0 | 0 | 9 | 74 | 73 | 76 | 15 | 16 | 13 | 10 min. |
| 1B | 87 | 42 | 48 | 45 | 21 | 23 | 21 | 63 | 71 | 66 | 27 | 18 | 24 | 30 min. |
| 1C | 100 | 59 | 54 | 64 | 5 | 11 | 16 | 64 | 65 | 80 | 36 | 35 | 20 | 78 min. |
| 2[d] | 87 | 9 | 0 | 21 | 0 | 0 | 0 | 9 | 0 | 21 | 90 | 100 | 76 | — |
| 3[e] | 87 | 9 | 11 | — | 0 | 0 | — | 9 | 11 | — | 90 | 87 | — | 45 min. |
| 4[f] | 68 | — | 13 | 17 | — | 0 | 0 | — | 13 | 17 | — | 81 | 75 | 43 min. |
| 5 | 100 | 28 | 16 | 6 | 0 | 0 | 0 | 28 | 16 | 6 | 72 | 84 | 94 | 20 min. |
| 5A[g] | 100 | 62 | 26 | 17 | 0 | 0 | 0 | 62 | 26 | 17 | 38 | 74 | 83 | 23 min. |

[a]Total initial iridium agglomeration.
[b]Weight percent chloride on catalyst: initial, 0.67; S-1, 1.88; S-2, 2.0; S-3, 2.12.
[c]Weight percent chloride on catalyst: initial, 0.67.
[d]Weight percent chloride on catalyst: initial, 0.67; S-1, 1.47, S-2, 1.59; S-3, 1.71 (after second H$_2$ reduction).
[e]Values of Section 3 were not reported due to a lower observed temperature during the run.
[f]Values of Section 1 were not reported due to a lower observed temperature during the run.
[g]Weight percent chloride on catalyst prior to halogen redispersion: initial, 0.67; S-1, 1.20; S-2, 1.45; S-3, 1.52.

What is claimed is:

1. A process for reactivating an agglomerated catalyst containing metallic iridium comprising the steps of:
   (a) pretreating the catalyst by contact with a substantially elemental oxygen-free atmosphere comprising a halide-providing compound at an elevated temperature to provide about 1.3 weight percent and above, halide to the catalyst, taken as the coke-free dry, catalyst; and
   (b) redispersing the metallic iridium from step (a) while maintaining said 1.3 weight percent and above halide provided to the catalyst by contact at an elevated temperature with an atmosphere comprising elemental halogen and water, wherein said water is present in about 0.05 to 2 volume percent, for a time sufficient to substantially redisperse said metallic iridium.

2. The process of claim 1 wherein said catalyst initially present substantially as agglomerated metallic iridium.

3. The process of claim 1 wherein said agglomerated iridium-containing catalyst is present on a catalyst support selected from silica, zeolite, alumina, silica-alumina, zirconia, alumina-zirconia and mixtures thereof.

4. The process of claim 1 wherein said agglomerated catalyst further contains a metal cocatalyst selected from platinum, rhodium, rhenium, palladium and mixtures thereof.

5. The process of claim 1 wherein said halide-providing compound is one which generates a hydrogen halide in the presence of hydrogen gas.

6. The process of claim 5 wherein said halide-providing compound is selected from carbon tetrachloride, chloroform, methylene chloride, methyl chloride, 1,2-dichloroethane, hexachloroethane, and mixtures thereof, in the presence of hydrogen gas.

7. The process of claim 1 wherein said halide-providing compound is hydrogen chloride.

8. The process of claim 1 wherein said halide is present on the catalyst after step (a) in an amount of about 1.4 to 2.5 weight percent, taken as the coke-free, dry, catalyst.

9. The process of claim 1 wherein said catalyst after completion of step (a) is saturated with halide.

10. The process of claim 1 wherein said agglomerated catalyst is platinum-iridium supported on alumina.

11. The process of claim 1 wherein said catalyst is platinum-iridium-rhenium supported on alumina.

12. The process of claim 1 wherein the temperature in step (a) is in the range of about 250° to 600° C.

13. The process of claim 1 wherein said elemental halogen in step (b) is chlorine.

14. The process of claim 1 wherein said temperature in step (b) is in the range of about 450° to 600° C.

15. The process of claim 1 wherein said metallic iridium is 75–100% redispersed.

16. The process of claim 1 wherein said catalyst further contains iridium oxide which is contacted with a reducing atmosphere at elevated temperature to substantially convert said iridium oxide to metallic iridium prior to or concurrently with step (a).

17. The process of claim 16 wherein said reducing atmosphere comprises hydrogen gas.

18. The process of claim 16 wherein the temperature of said contacting with said reducing atmosphere is in the range of about 250°–600° C.

19. A process for reactivating an agglomerated platinum-iridium on alumina catalyst, containing platinum and iridium oxides, comprising the steps of:
   (a) contacting said agglomerated catalyst with a hydrogen atmosphere at a temperature in the range of about 300° to 540° C., a pressure of about 0.1–2 MPa, for a sufficient time to substantially reduce said oxides of platinum and iridium to the respective metals;
   (b) pretreating said catalyst from step (a) by contact with an elemental oxygen-free atmosphere comprising hydrogen chloride at a temperature in the range of about 300° to 540° C. and a pressure of about 0.1–2 MPa for a time sufficient to saturate the catalyst with chloride; and
   (c) redispersing the metallic iridium and platinum while maintaining a saturated chloride level by contact with an atmosphere comprising elemental chlorine and water, in a water volume percent of about 0.05 to 2, at a temperature in the range of about 500° to 540° C., and a pressure of about 0.1–2 MPa for a time sufficient to effect about a 75–100% redispersion of both metallic platinum and iridium.

20. A process for reactivating an agglomerated metallic platinum-iridium on alumina catalyst, which has been partially decoked by hydrogen gas, comprising the steps of:
   (a) pretreating said catalyst by contact with an elemental oxygen-free atmosphere comprising hydrogen chloride at a temperature in the range of about 300° to 540° C. and a pressure of about 0.1–2 MPa for a time sufficient to saturate the catalyst with chloride; and
   (b) redispersing the metallic iridium and platinum while maintaining a saturated catalyst chloride level by contact with an atmosphere comprising elemental chlorine and water, in a water volume percent of about 0.05 to 2, at a temperature in the range of about 500° to 540° C., and a pressure of about 0.1–2 MPa for a time sufficient to effect about a 75–100% redispersion of both metallic platinum and iridium.

* * * * *